United States Patent
Yu et al.

(10) Patent No.: US 9,958,082 B2
(45) Date of Patent: May 1, 2018

(54) ROTATION TYPE FLOW PATH SWITCHING VALVE

(71) Applicant: ZHEJIANG SANHUA ROTARY VALVE CO., LTD., Zhejiang (CN)

(72) Inventors: Shijun Yu, Shanghai (CN); Honglian Liao, Zhejiang (CN); Yong Zhu, Zhejiang (CN); Shuai Xiao, Zhejiang (CN)

(73) Assignee: ZHEJIANG SANHUA ROTARY VALVE CO., LTD., Zhejiang (CN)

( * ) Notice: Subject to any disclaimer, the term of this patent is extended or adjusted under 35 U.S.C. 154(b) by 0 days. days.

(21) Appl. No.: 15/119,850

(22) PCT Filed: Jul. 25, 2014

(86) PCT No.: PCT/CN2014/083083
§ 371 (c)(1),
(2) Date: Aug. 18, 2016

(87) PCT Pub. No.: WO2015/123965
PCT Pub. Date: Aug. 27, 2015

(65) Prior Publication Data
US 2017/0059055 A1 Mar. 2, 2017

(30) Foreign Application Priority Data

Feb. 22, 2014 (CN) .......................... 2014 1 0064724
May 16, 2014 (CN) .......................... 2014 1 0213705

(51) Int. Cl.
*F16K 5/16* (2006.01)
*F16K 31/04* (2006.01)
(Continued)

(52) U.S. Cl.
CPC ............ *F16K 31/041* (2013.01); *F16K 5/166* (2013.01); *F16K 11/044* (2013.01); *F16K 11/0833* (2013.01); *F16K 31/043* (2013.01)

(58) Field of Classification Search
USPC ........................................................ 251/163
See application file for complete search history.

(56) References Cited

U.S. PATENT DOCUMENTS 1,558,979 A * 10/1925 Guillery .................. F16K 5/162
137/625.43
1,650,312 A * 11/1927 Wildin .................. F16K 5/0271
251/163
(Continued)

FOREIGN PATENT DOCUMENTS

CN 2174605 Y 8/1994
CN 1224129 A 7/1999
(Continued)

*Primary Examiner* — John Fox
(74) *Attorney, Agent, or Firm* — Arent Fox LLP; Michael Fainberg

(57) ABSTRACT

The invention discloses a rotation-type flow path switching valve, which includes a driving component and a valve body component connected with a driving shaft. The valve body component includes a valve body, and a spool. The valve body component further includes: a driving disc, and a driven disc which is connected, by means of a first gap linkage mechanism, with the driving disc to transfer an axial movement within a preset swivel stroke of the driving disc. The driving shaft and the spool are connected by means of a second gap linkage mechanism to transfer the axial movement to the spool within a preset swivel stroke of the driving shaft. The valve body component further includes a spring which makes the spool abut against the valve body.

20 Claims, 6 Drawing Sheets

(51) Int. Cl.
 *F16K 11/083* (2006.01)
 *F16K 11/044* (2006.01)

(56) References Cited

U.S. PATENT DOCUMENTS

| | | | | |
|---|---|---|---|---|
| 2,009,358 A | * | 7/1935 | Fennema | F16K 5/162 251/163 |
| 2,179,684 A | * | 11/1939 | Brown | F16K 5/162 251/163 |
| 2,222,626 A | * | 11/1940 | Mueller | F16K 5/162 251/163 |
| 2,298,036 A | * | 10/1942 | Cohen | F16K 5/163 12/142 F |
| 2,510,494 A | * | 6/1950 | Bowan | F16K 5/025 251/163 |
| 2,606,737 A | * | 8/1952 | Tratzik | F16K 5/222 137/246.11 |
| 3,395,889 A | * | 8/1968 | Chovan | F16K 5/0278 251/163 |
| 4,073,468 A | * | 2/1978 | Erwin | F16K 5/02 251/163 |
| 6,708,948 B2 | * | 3/2004 | Nosel | F16K 5/02 251/288 |

FOREIGN PATENT DOCUMENTS

| | | |
|---|---|---|
| CN | 200982444 Y | 11/2007 |
| CN | 201753785 U | 3/2011 |
| CN | 102042422 A | 5/2011 |
| CN | 202914602 U | 5/2013 |
| JP | 2012237344 A | 12/2012 |
| JP | 2013029168 A | 2/2013 |

* cited by examiner

ROTATION TYPE FLOW PATH SWITCHING VALVE

TECHNICAL FIELD OF THE INVENTION

The invention relates to the technical field of cooling control system, and in particular to a rotation-type flow path switching valve, which is especially applicable to a large-scale commercial cooling system.

BACKGROUND OF THE INVENTION

At present, a large-scale parallel piston switching valve is the primary switching valve as one of cooling control components of a commercial air-conditioning system, and the application of the product in markets has been mature. But the market feedback and the technical analysis indicate that the parallel switching valve is not beneficial for reducing the cost and improving the energy utilization efficiency because of high cost, large pressure loss and other causes. So, the field of commercial control system starts to consider replacing the parallel switching valve with a rotation-type switching valve. For example, in Chinese Patent CN102042422B, a rotation-type switching valve technology which is used in the commercial cooling system is provided, whose specific working manner is as follows:

1. in a cooling steady state: a spool and a valve port of a valve body are in a force-fit state; via a switching passage in the spool, high-pressure gas enters a condenser, and low-pressure gas enters a compressor by an evaporator outlet to suction; 2. in a reversing process: the spool is presses downward to be separated from the valve body, then a gap generates between the valve body and the spool; the switching valve further rotates to reverse, at this point, the spool and the valve body do not contact, thereby ensuring successful completion of reversing; then the spool is reset under an action of a spring to make the spool and the valve port of the valve body in a pressed state; 3. in a heating steady state: the spool and the valve port of the valve body are in a force-fit state; via the switching passage in the spool, the high-pressure gas enters a heat exchanger.

In the technical solution, for avoiding a problem that in form of metal hard seal, the spool is stuck to not reverse because of the influences of impurity, temperature, lubrication and other factors, a manner of spool ejecting to spool rotating to spool resetting is adopted, which achieves the reversing aim of high flowing performance, and effectively solves the problem of reversing stuck.

However, for achieving the aim of intermittent transfer, the traditional art adopts a planetary gear, a mechanical telescoping mechanism, a thread linkage, and so on; so the structure is relatively complicated, and the cost is relatively high. Besides, because the moment and reversing pressing force generated by mechanism drive in a piece of large-scale cooling equipment are very large, after the product runs for a certain period of time, the gear and thread of a metal component are easy to wear, which influences the accuracy of running linkage, decreases the reliability of the product, and causes a hidden trouble to safety.

Meanwhile, a further problem in the traditional art is that the spool is an inverted-cone-shaped structure matching with the valve body. Because a sealing surface between the spool and the valve body makes, under an action of pressure difference between the high pressure and the low pressure of the valve, the spool subject to force towards a pressing direction, and in the large-scale commercial cooling system, the pressing force may be relatively large, it is difficult to separate the spool from the valve body by the set spring alone, and the reliability is low. And for this, how to provide a switching valve with high reliability and simple structure which is applied to a large-scale cooling control system is the problem to be solved by those skilled in the art.

SUMMARY OF THE INVENTION

In view of the above problem, the invention discloses a rotation-type flow path switching valve, which comprises a driving component and a valve body component connected by means of a driving shaft of the driving component; the valve body component comprises a valve body which is provided with a first group of flow path passages and a second group of flow path passages, and a spool which switches the first group of flow path passages and the second group of flow path passages by rotating; the valve body component further comprises a driving disc which is driven by the driving shaft to rotate, and a driven disc which is connected, by means of a first gap linkage mechanism, with the driving disc to transfer an axial movement within a preset swivel stroke of the driving disc; the driving shaft and the spool are connected by means of a second gap linkage mechanism to transfer a circumferential movement to the spool within a preset swivel stroke of the driving shaft; the valve body component further comprises a spring which makes the spool abut against the valve body.

As to the rotation-type flow path switching valve, furthermore, the first gap linkage mechanism comprises a first convex-concave portion which is provided at an end of the driving disc and a second convex-concave portion which is provided at an end of the driven disc; the match of the first convex-concave portion and the second convex-concave portion makes the driving disc or the driven disc abutting against the spool to make the spool move along the axes of the driving disc or the driven disc.

Furthermore, the first convex-concave portion comprises two first convex portions which are provided oppositely and two first concave portions which are provided between the two first convex portions; the adjacent first convex portion and first concave portion are jointed by means of a first bevel portion; the second convex-concave portion comprises two second convex portions which are provided oppositely and two second concave portions which are provided between the two second convex portions; the adjacent second convex portion and second concave portion are jointed by means of a second bevel portion; wherein, a shape of the second convex portion adapts with a shape of the first concave portion, a shape of the second concave portion adapts with a shape of the first convex portion, and a shape of the second bevel portion adapts with a shape of the first bevel portion.

Furthermore, the second gap linkage mechanism comprises a first mating hole which is provided on the spool and provided with a first circumferential limiting portion, and a first mating shaft which is provided on the driving shaft; the match of the first mating shaft and the first mating hole makes the driving shaft drive the spool to rotate in its preset swivel stroke.

Preferably, the rotation-type flow path switching valve further comprises a first limiting mechanism which limits a circumferential rotation of the driven disc, and a second limiting mechanism which limits the axial movement of the driven disc; the driving disc is provided on the driving shaft in an axially sliding way, and abuts against the spool to make the spool move along the axes of the driving disc.

Furthermore, the rotation-type flow path switching valve further comprises a limiting plate which is fixed on the valve body; the first limiting mechanism comprises a second mating hole which is provided on the limiting plate and provided with a second circumferential limiting portion, and a second mating shaft which is provided on the driven disc.

Furthermore, the second limiting mechanism comprises a first limiting end which is provided on the limiting plate and a second limiting end which is provided on the driven disc.

Preferably, the driving disc and the driving shaft are fixedly connected, and the driven disc can axially move abutting against the spool.

Furthermore, the first mating shaft provided on the driving shaft is specifically a rectangular key shaft.

Furthermore, there is also a stopper which stops the spool from rotating provided on the valve body component.

Furthermore, as to the rotation-type flow path switching valve, the spool is a frustum structure of approximately small top and big bottom which is provided with at least two switching passages; ports of the two switching passages are provided on conical surfaces, the spring is provided at a bottom of the spool, and the first mating hole is provided at an upper part of the spool.

Furthermore, the valve body is provided with a valve chamber of approximately small top and big bottom which matches with the spool; a valve port is provided on the conical surface of the valve body.

Furthermore, as to the rotation-type flow path switching valve, when moving axially, the spool does not rotate; when rotating, the spool does not move axially.

Furthermore, when the spool axially moves, under a pressure of the spring, to abut against the valve body, the driving shaft does not rotate.

Furthermore, the flow path switching process of the rotation-type flow path switching valve comprises three stages: in a first stage, the driving shaft drives the driving disc to rotate, the spool axially moves in an opposite direction of abutting against the valve body, and the spool does not rotate; in a second stage, the driving shaft drives the driving disc to rotate, the spool synchronously rotates with the driving shaft, and the spool does not move axially; and in a third stage, the driving shaft and the driving disc do not rotate, the spool axially moves in a direction of abutting against the valve body, and the spool does not rotate.

Furthermore, in the first stage and the second stage, the driven disc does not rotate; in the third stage, the driven disc rotates, and a rotating direction of the driven disc is opposite to the rotating direction of the driving disc in the first stage.

Furthermore, the driving disc is connected with the driving shaft fixedly, and the driven disc abuts against the spool to make the spool move along the axes of the driven disc.

By respectively setting convex-concave linkage mechanisms in a circumferential direction and an axial direction among the driving shaft, the driving disc, the driven disc, the spool and the valve body, the rotation-type flow path switching valve provided by the invention controls, in a preset angle stroke range, the rotation or the axial movement of the spool to achieve the reversing process. Actions in different stages can be provided independently, and the structure is simple. Besides, with the convex-concave linkage mechanism, even a certain degree of wear is generated on a moving surface of a moving component, a phenomenon of moving stuck will not happen, which avoids the connection between a gear and a thread and avoids a problem of being easy to wear after a long-time movement under force, and improving the reliability of the system.

BRIEF DESCRIPTION OF THE DRAWINGS

FIG. 4 shows an expanded view of the driving disc and the driven disc;

FIG. 6 shows an expanded view of the driving disc and the driven disc;

Signs in the accompanying drawings are described as follows:

100—driving component, 200—valve body component;
210—valve body, 211—valve port, 212—limiting pin;
220—spool, 221—first mating hole;
222/223—switching passage;
224/225/226/227—spool port;
228—limiting member, 229—first circumferential limiting portion;
230—limiting plate, 231—second mating hole;
232—first limiting end, 234—circumferential convex—concave portion;
235—second circumferential limiting portion;
240—spring;
250/250A—driving disc, 251—first convex—concave portion, 254—key slot;
260/260A—driven disc, 261—second convex—concave portion;
262—second mating shaft, 263—second limiting end, 264—convex—concave portion;
270—base, 280—cover plate, 290—valve chamber;
300—driving shaft, 310—first mating shaft.

DETAILED DESCRIPTION OF THE EMBODIMENTS

The core of the invention is to provide a rotation-type flow path switching valve which is used for a cooling system, wherein the rotation-type flow path switching valve has a simple structure and high reliability; in general, by taking a four-way reversing valve for example, the invention is further elaborated below in combination with the accompanying drawings and specific embodiments.

Note that, nouns of locality like left, right, up and down involved in the invention are just for describing the technical solutions clearly and conveniently. It should be understood that the nouns of locality adopted in the invention should not limit the scope of the claims of the application.

Figure 1:
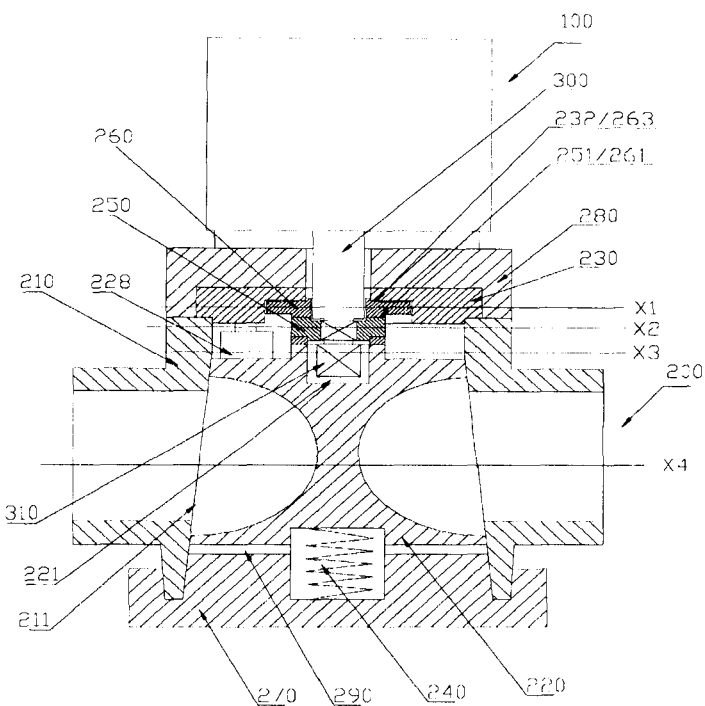
FIG. 1 is a schematic diagram of a preferred embodiment of a rotation-type flow path switching valve provided by the invention.
Figure 9:
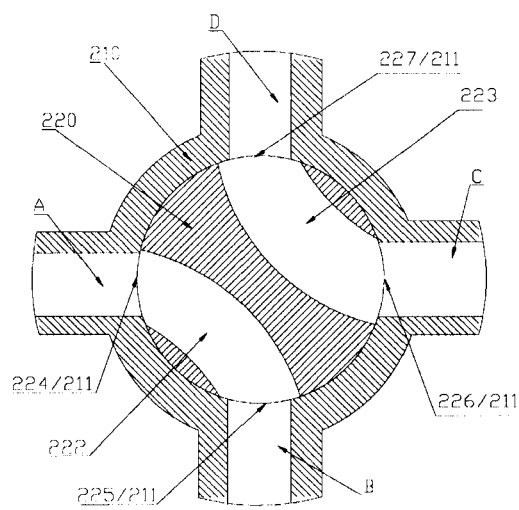
FIG. 9 is a structure diagram that the switching valve in FIG. 1 is on the section X4 to reflect the flow path switch.

FIG. 1 is a schematic diagram of a preferred embodiment of a rotation-type flow path switching valve provided by the invention; FIG. 9 is a structure diagram that the switching valve in FIG. 1 is on the section X4 to reflect the flow path switch.

As shown in FIG. 1 and FIG. 9, the rotation-type flow path switching valve comprises a driving component 100 and a valve body component 200; a driving shaft 300 on the driving component 100 connects with the valve body component 200. The driving component 100 is generally composed of a stepping motor and a reducing structure (not shown in the figures). The valve body component 200 comprises a valve body 210, a base 270 which is fixed at a bottom of the valve body 210, and a cover plate 280 which is fixed at an upper part of the valve body 210. In the present specific embodiment, a frustum-shaped valve chamber 290 of approximately small top and big bottom is formed in a middle of the valve body 210; and a frustum-structured spool 220 of approximately small top and big bottom is provided in the valve chamber. The base 270 matches with the cover plate 280 to make the valve chamber 290 airtight up and down. The valve body 210 and the spool 220 are sealed by means of a conical surface. Four spool ports 224/225/226/227 are provided on the conical surface of the spool 220, and there is a first switching passage 222 which connects the port 224 with the port 225 and a second switching passage 223 which connects the port 226 with the port 227 in the spool 220.

Four ports A, B, C and D are provided on the valve body 210; the four ports A, B, C and D extend to the valve chamber 290 to form a valve port 211 on the conical surface. By means of a rotation of the spool 220, the first switching passage 222 is enabled to connect the port A and the port B, and the second switching passage 223 is enabled to connect the port C and the port D, that is, "A-B, C-D" can be defined as a first group of flow path passages of the valve body 210; by means of the rotation of the spool 220, the first switching passage 222 is enabled to connect the port B and the port C, and the second switching passage 223 is enabled to connect the port D and the port A, that is, "B-C, D-A" can be defined as a second group of flow path passages of the valve body 210. When the first group of flow path passages is opened, the second group of flow path passages is closed; when the second group of flow path passages is opened, the first group of flow path passages is closed. The above functions can implement the flow path switch of the system. Certainly, the functional requirements of the flow path switching valve can also be met by performing the flow path switch in other ways. In the present embodiment, the four-way reversing valve is taken for example, but the designer in the technical field can also design a multi-channel reversing form, which is not repeated here.

A spring 240 is installed at a bottom of the spool 220; the spring 240 presses upwards, by means of the base 270 of the valve body 200, the spool 220 against the valve body 210 to close the valve port 211.

In the present embodiment, a driving shaft 300 and a driving disc 250 in the valve body component 200 are connected by means of a key slot 254. The driving disc 250 is provided on the driving shaft 300 in an axially sliding way, and can also move up and down with respect to the driving shaft 300 on the premise that the driving shaft 300 can drive the driving disc 250 to rotate.

Figure 2A:
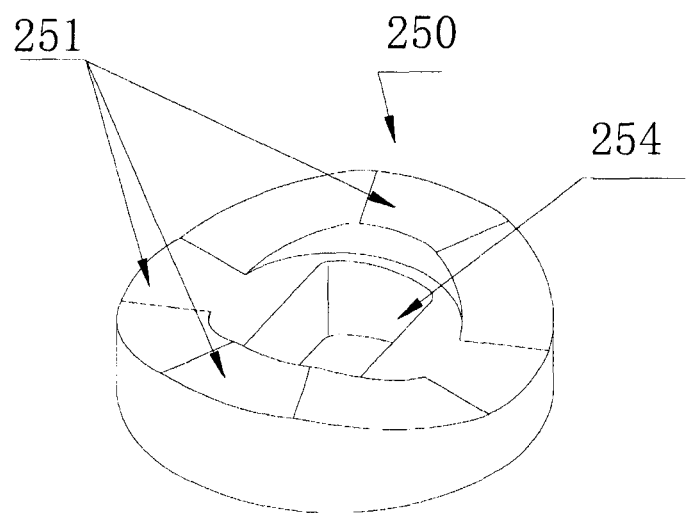
FIG. 2a is a structure diagram of a driving disc of the switching valve in FIG. 1.
Figure 2B:
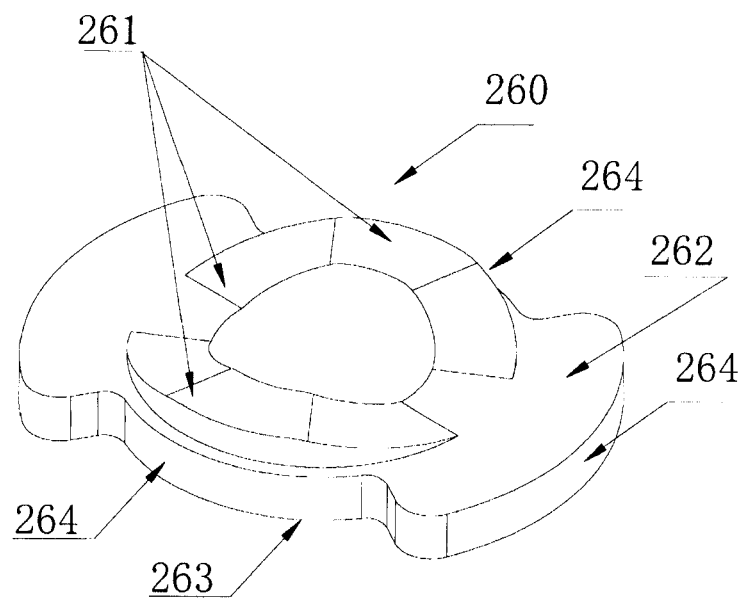
FIG. 2b is a structure diagram of a driven disc of the switching valve in FIG. 1.
Figure 3:
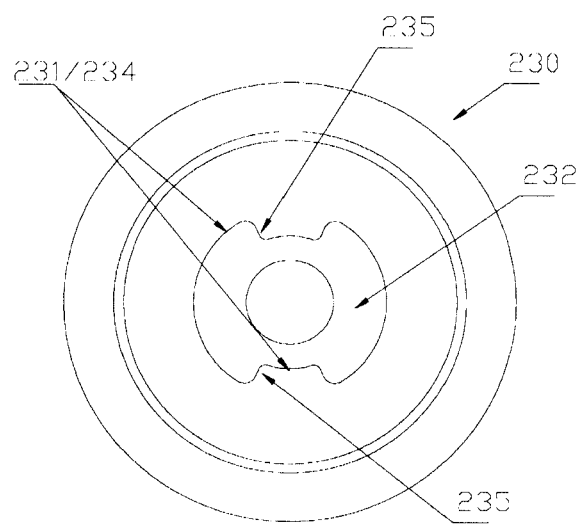
FIG. 3 is a structure diagram of a limiting plate of the switching valve in FIG. 1.

FIG. 2a and FIG. 2b are structure diagrams of a driving disc and a driven disc of the switching valve in FIG. 1. FIG. 3 is a structure diagram of a limiting plate of the switching valve in FIG. 1.

As shown in FIG. 2a, FIG. 2b and FIG. 3, and referring to FIG. 1, the driven disc 260 is provided above the driving disc 250; a first convex-concave 251 is provided at the end, axially facing the driven disc 260, of the driving disc 250, and a second convex-concave 261 is provided at the end, axially facing the driving disc 250, of the driven disc 260. The first convex-concave 251 matches with the second convex-concave 261 to form a first gap linkage mechanism, which makes the driving disc 250 transfer a movement to the driven disc 260 within a preset swivel stroke (i.e. according to a principle of cam mechanism, the driven disc 260 is pressed in a set swivel range of the driving disc 250, and the driving disc 250 axially moves).

As shown in FIG. 2a, FIG. 2b and FIG. 3, the first convex-concave portion 251 comprises two first convex portions which are provided oppositely and two first concave portions which are provided between the two first convex portions; the adjacent first convex portion and first concave portion are jointed by means of a first bevel portion; the second convex-concave portion 261 comprises two second convex portions which are provided oppositely and two second concave portions which are provided between the two second convex portions; the adjacent second convex portion and second concave portion are jointed by means of a second bevel portion; wherein, a shape of the second convex portion adapts with a shape of the first concave portion, a shape of the second concave portion adapts with a shape of the first convex portion, and a shape of the second bevel portion adapts with a shape of the first bevel portion.

The driven disc 260 is detachably sleeved on a peripheral part of the driving shaft 300; the limiting plate 230 is fixed on the valve body 210; the peripheral part of the driven disc 260 is provided with a convex-concave portion 264 which extends outwards, and a convex portion serves as a second mating shaft 262 of a circumferential limiting portion. An incomplete round hole with a circumferential convex-concave portion 234 towards the axis is provided in a middle of the limiting plate 230 to serve as a second mating hole 231, and the internal convex portion forms a second circumferential limiting portion 235. The second mating shaft 262 and the second mating hole 231 are provided oppositely to serve as a first limiting mechanism, so as to stop the driven disc 260 from rotating circumferentially within a preset swivel stroke of the driven disc 260 (i.e. after the second mating shaft 262 of the driven disc 260 rotates freely in the second mating hole 231 for an angle, it contacts the second circumferential limiting portion 235 and stops rotating).

There is also a first limiting end 232 provided at a lower end, facing to the driven disc 260, of the limiting plate 230; and there is also a second limiting end 263 provided at an upper end, facing to the limiting plate 230, of the driven disc 260; the first limiting end and the second limiting end matches to serve as a second limiting mechanism, so as to limit the driven disc 260 to axially moving up.

An end of the driving shaft 300 is provided with a rectangular key shaft as a first mating shaft 310; a counter bore with circumferential convex and concave towards the axis which is provided on the spool 220 serves a first mating hole 221, a transition part of the convex and the concave serves as a first circumferential limiting portion 229. The first mating hole 221 and the first mating shaft 310 matches to serve as a second gap linkage mechanism, so as to make the driving shaft 300 drive the spool 220 to rotate within the preset swivel stroke of the driving shaft 300 (i.e. after the first mating shaft 310 of the driving shaft 300 rotates freely in the second mating hole 231 for an angle, it contacts the first circumferential limiting portion 229 and drives the spool 220 to rotate).

Figure 4:
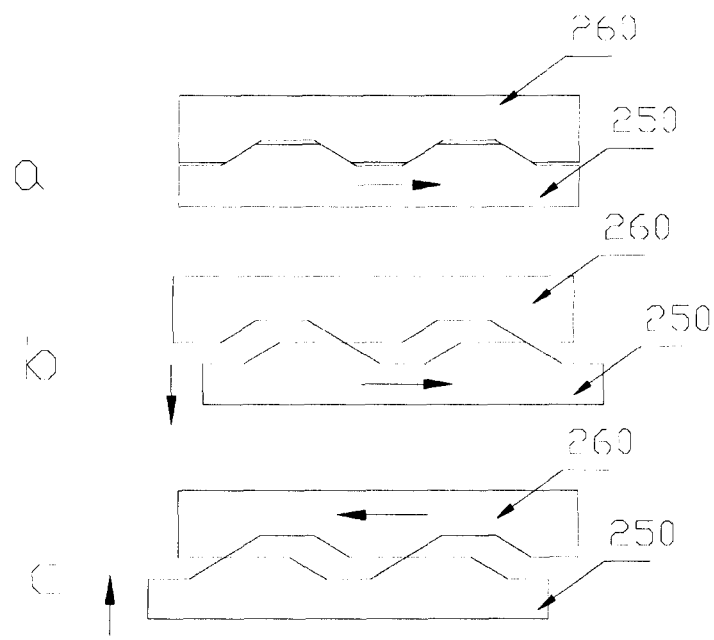
FIG. 4 is a schematic diagram of a position change process between the driving disc and the driven disc when a driving shaft rotates counterclockwise.
Figure 5:
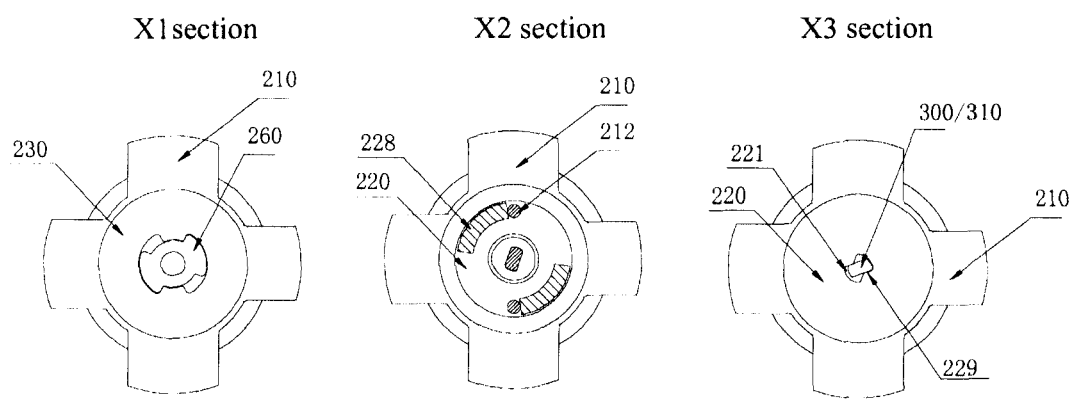
FIG. 5 is a schematic diagram that the switching valve in FIG. 1 is on sections X1/X2/X3 respectively to reflect moving states of different linkage mechanisms when the driving shaft rotates counterclockwise.

FIG. 4 is a schematic diagram of a position change process between the driving disc and the driven disc when the driving shaft rotates counterclockwise; FIG. 5 is a schematic diagram that the switching valve in FIG. 1 is on sections X1/X2/X3 respectively to reflect the moving states of different linkage mechanisms when the driving shaft rotates counterclockwise, wherein the section X1 mainly reflects a change of position relation between the driven disc 260 and the limiting plate 230; the section X2 mainly reflects a change of limit relation between the spool 220 and the valve body 210; and the section X3 mainly reflects a change of position relation between the driving shaft 300 and the spool 220.

As shown in FIG. 4 and FIG. 5, supposing that the relative states of the driven disc 260, the driving disc 250, the spool 220 and other moving components of the valve body component 200 at a beginning of reversing are shown as FIG. 5, that is, the relationship of relative positions of the driving components on the sections X1, X2 and X3 are reflected. When the driving shaft 300 starts to rotate counterclockwise, it drives the driving disc 250 to rotate counterclockwise, then the first convex-concave portion and the second convex-concave portion (a cam linkage structure) of the driving disc 250 and the driven disc 260 have been in a fit state (see the position relation a in FIG. 4), at this point, the first convex portion of the first convex-concave portion 251 matches with the second concave portion of the second convex-concave portion 261. And the driven disc 260 cannot move because of the axial limit and the circumferential rotation limit of the limiting plate 230, the driving disc 250 rotationally extrudes the driven disc 260, and the pressure makes the driving disc 250 move downwards (see the position relation b in FIG. 4); in the process, a second bevel portion of the second convex-concave portion 261 orients to a first bevel portion of the first convex-concave portion 251, so that the driving disc 250 moves downwards. In this way, the driving disc 250 drives the spool 220 to overcome the elasticity of the spring 240 to move downwards, so that the spool 220 and the valve body 210 are separated to open the four ports A, B, C and D on the valve body 210. In the above moving process, because of the set position relation of the second gap linkage mechanism (see the X3 section view in FIG. 5), the first mating shaft 310 of the driving shaft 300 and the first mating hole 221 of the spool 220 are separated, so the spool 220 does not rotate.

After rotating for a certain stroke, the first mating shaft 310 of the driving shaft 300 contacts the first circumferential limiting portion 229 of the first mating hole 221 of the spool 220 to drive the spool 220 to rotate. After the driving shaft 300 drives the spool 220 to continue rotating to a certain stroke, a limiting member 228 (which can be an arc-shaped piece) provided on the spool 220 contacts a stopper (a limiting pin 212) provided on the limiting plate 230 of the valve body component 200 (see the X2 section view in FIG. 7), then the spool 220 stops rotating, the driving component 100 completes an action, and the valve body component 200 completes a reversing function.

In this state, the spring 240 applies, by the spool 220, an axial upward force to the driving disc 250, because of an abutting relationship between the first convex-concave portion of the driving disc 250 and the second convex-concave portion of the driven disc 260, the driven disc 260 is forced to rotate clockwise, this way, the driving disc 250 rises (see the position relation c in FIG. 4), and the spool 220 also axially moves upward, so as to implement a reverting function of the spool 220.

Figure 6:
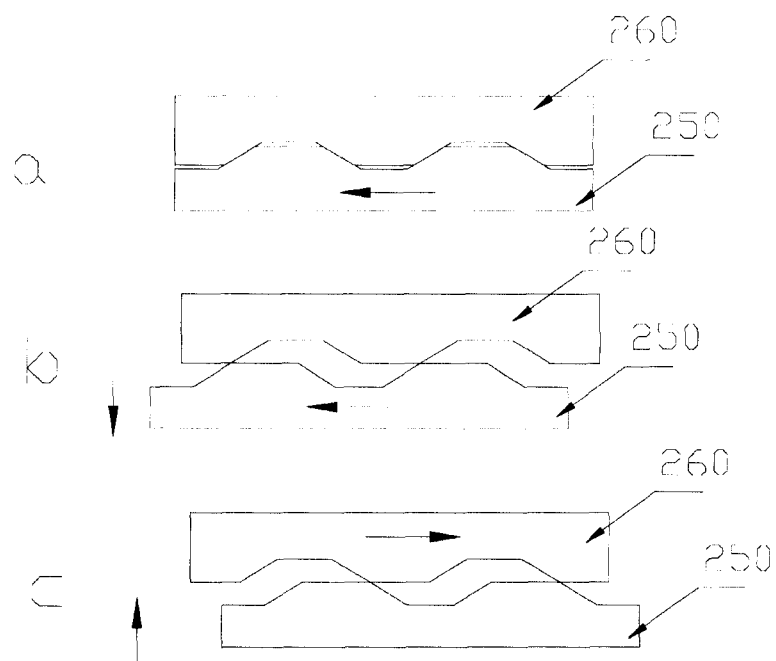
FIG. 6 is a schematic diagram of a position change process between the driving disc and the driven disc when the driving shaft rotates clockwise.
Figure 7:
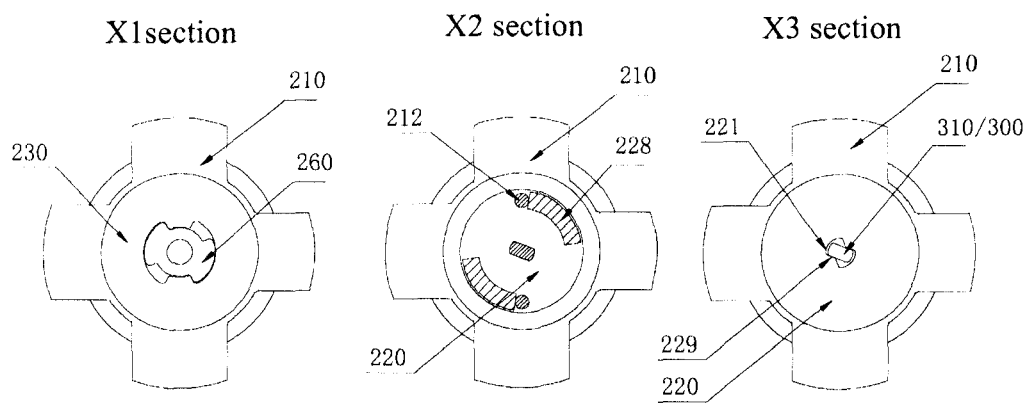
FIG. 7 is a schematic diagram that the switching valve in FIG. 1 is on the sections X1/X2/X3 respectively to reflect moving states of different linkage mechanisms when the driving shaft rotates clockwise.

FIG. 6 is a schematic diagram of a position change process between the driving disc and the driven disc when the driving shaft rotates clockwise; FIG. 7 is a schematic diagram that the switching valve in FIG. 1 is on the sections X1/X2/X3 respectively to reflect the moving states of different linkage mechanisms when the driving shaft rotates clockwise, wherein the section X1 mainly reflects a change of position relation between the driven disc 260 and the limiting plate 230; the section X2 mainly reflects a change of limit relation between the spool 220 and the valve body 210; and the section X3 mainly reflects a change of position relation between the driving shaft 300 and the spool 220.

As shown in FIG. 6 and FIG. 7, supposing that the relative states of the driven disc 260, the driving disc 250, the spool 220 and other moving components of the valve body component 200 at a beginning of reversing are shown as FIG. 7, that is, the relationship of relative positions of the driving components on the sections X1, X2 and X3 are reflected. When the driving shaft 300 starts to rotate clockwise, it drives the driving disc 250 to rotate clockwise, then the first convex-concave portion and the second convex-concave portion (a cam linkage structure) of the driving disc 250 and the driven disc 260 have been in a fit state (see the position relation a in FIG. 6), and the driven disc 260 is subject to an axial upward limit of the first limiting end 232 of the limiting plate 230 and a rotation limit of the second circumferential limiting portion 235. The driving disc 250 rotationally extrudes the driven disc 260, and the pressure makes the driving disc 250 move downwards (see the position relation b in FIG. 6), in this way, the driving disc 250 drives the spool 220 to overcome the elasticity of the spring 240 to move downwards, so that the spool 220 and the valve body 210 are separated to open the four ports A, B, C and D on the valve body 210. In the above moving process, because of the set position relation of the second gap linkage mechanism (see the X3 section view in FIG. 7), the first mating shaft 310 of the driving shaft 300 and the first circumferential limiting portion 229 of the first mating hole 221 of the spool 220 do not contact, so the spool 220 does not rotate.

After the driving shaft 300 rotates for a certain angle stroke, the first mating shaft 310 of the driving shaft 300 contacts the first circumferential limiting portion 229 of the first mating hole 221 of the spool 220 to drive the spool 220 to rotate. After the driving shaft 300 drives the spool 220 to continue rotating to a certain stroke, the limiting member 228 provided on the spool 220 contacts the stopper (the limiting pin 212) provided on the limiting plate 230 of the valve body component 200 (see the X2 section view in FIG. 5), then the spool 220 stops rotating, the driving component 100 completes the action, and the valve body component 200 completes the reversing function.

In this state, the spring 240 applies, by the spool 220, an axial upward force to the driving disc 250, because of an abutting relationship between the convex-concave portions of the driving disc 250 and the driven disc 260, the driven disc 260 is forced to rotate counterclockwise to rise the driving disc 250 (see the position relation c in FIG. 6), and the spool 220 also axially moves upward, so as to implement the reverting function of the spool 220.

Figure 10:
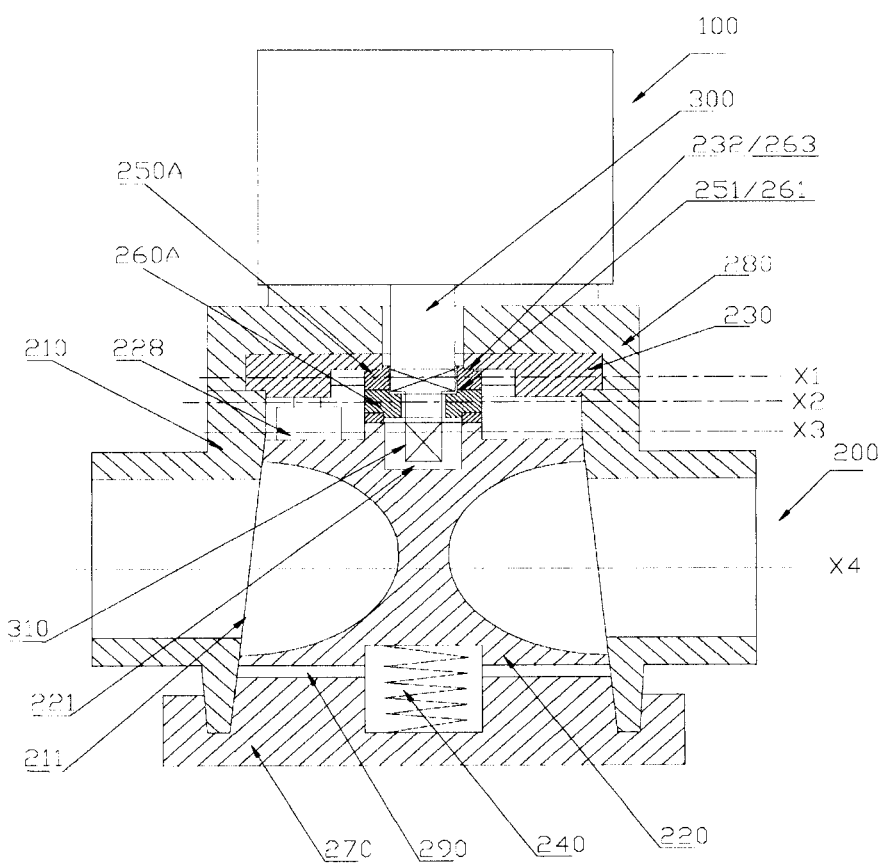
FIG. 10 is a schematic diagram of a preferred embodiment of another rotation-type flow path switching valve provided by the invention.

FIG. 10 is a schematic diagram of a preferred embodiment of another rotation-type flow path switching valve provided by the invention.

As shown in FIG. 10, in the present specific embodiment, the above solution is extended as follows: the driving disc 250A is fixedly connected to the driving shaft 300, and the driven disc 260A can axially slide with respect to the driving shaft. The solution with this setting can also implement the switching function of the valve in the above technical solution, so it will not be repeated here. Those skilled in the art should be inspired, and the above changes should fall within the scope of the claims of the invention.

Figure 8:
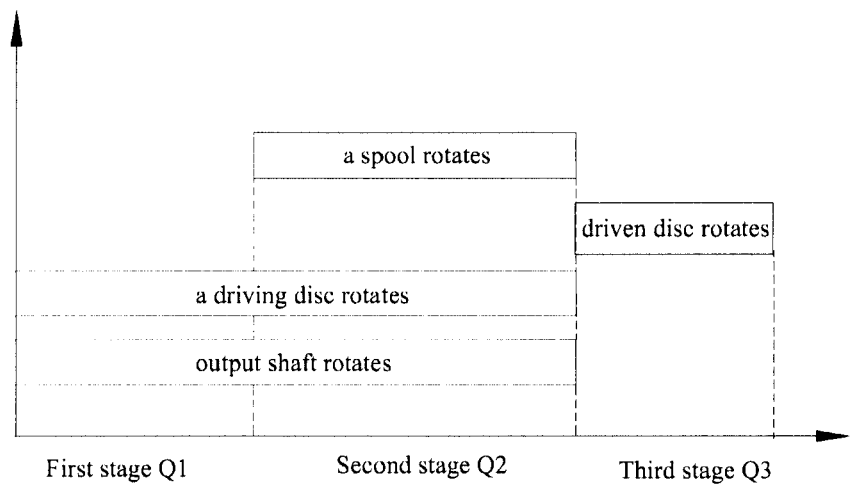
FIG. 8 is a schematic diagram of a sequential variation of related moving components in a process of flow path switch.

FIG. 8 is a schematic diagram of a sequential variation of related moving components in the process of flow path switch of the switching valve.

As shown in FIG. 8, the process of flow path switch of the switching valve comprises three stages: in a first stage Q1, the driving shaft 300 drives the driving disc 250 to rotate, the spool 220 axially moves in an opposite direction of abutting against the valve body 210 to separate from the valve body 210, and the spool 220 does not rotate; in a second stage Q2, the driving shaft 300 drives the driving disc 250 to rotate, the spool 220 synchronously rotates with the driving shaft 300, and the spool 220 does not move axially; and in a third stage Q3, the driving shaft 300 and the driving disc 250 do not rotate, the spool 220 axially moves in a direction of abutting against the valve body 210 to abut against the valve body 210, and the spool 220 does not rotate.

In the first stage and the second stage, the driven disc 260 does not rotate; in the third stage, the driven disc 260 rotates, and the rotating direction of the driven disc 260 is opposite to the rotating direction of the driving disc 250 in the first stage.

By respectively setting the convex-concave linkage mechanisms in a circumferential direction and an axial direction among the driving shaft, the driving disc, the driven disc, the spool and the valve body, the rotation-type flow path switching valve provided by the invention controls, in the preset angle stroke range, the rotation or the axial movement of the spool to achieve the reversing process. Actions in different stages can be provided independently, and the structure is simple. In addition, because of a downward action of gravity of the spool, the valve is easy to be opened under a pressure of a bevel of the cam, so a phenomenon of moving stuck is less likely to happen; another advantage is that: after a driving mechanism (motor) stops, the spool returns to a sealed state under the pressure of the bevel of the cam, which can shorten a moving stroke of the motor, and gives clearance time for the next reversing. At the same time, the design of frustum structure of approximately small top and big bottom makes the structure simpler; a spring can be provided for ensuring the big end surface of the frustum to be pressed and sealed, and the small end surface makes, by means of the design of match between the cam and the shaft, the driving of a motor implement the axial movement and the circumferential rotation of the spool.

The rotation-type flow path switching valve provided by the invention is elaborated above in combination with the specific embodiments. The principle and implementation of the invention are described in this application by taking specific examples; the above description of the embodiments is only used for helping understand the method of the invention and its core idea. It should be indicated that, on the premise of not departing from the principles of the invention, those ordinary skill in the art can also make a number of improvements and supplements, and these improvements and supplements should fall within the scope of the claims of the invention.

The invention claimed is:

1. A rotation-type flow path switching valve, comprising:
a driving component; and
a valve body component connected with a driving shaft of the driving component; the valve body component comprises a valve body and a spool, wherein the valve body comprises a first group of flow path passages and a second group of flow path passages, and the spool switches the first group of flow path passages and the second group of flow path passages by rotating;
wherein,
the valve body component further comprises:
a driving disc which is driven by the driving shaft to rotate;
a driven disc which is connected, by means of a first gap linkage mechanism, with the driving disc to transfer an axial movement to the spool within a preset swivel stroke of the driving disc; and
a spring, which makes the spool abut against the valve body;
wherein, the driving shaft and the spool are connected by means of a second gap linkage mechanism to transfer a circumferential movement to the spool within a preset swivel stroke of the driving shaft.

2. The rotation-type flow path switching valve according to claim 1, wherein the first gap linkage mechanism comprises a first convex-concave portion which is provided at an end of the driving disc and a second convex-concave portion which is provided at an end of the driven disc; the match of the first convex-concave portion and the second convex-concave portion makes the driving disc or the driven disc abutting against the spool to make the spool move along the axes of the driving disc or the driven disc.

3. The rotation-type flow path switching valve according to claim 2, wherein the rotation-type flow path switching valve further comprises: a first limiting mechanism which limits a circumferential rotation of the driven disc, and a second limiting mechanism which limits the axial movement of the driven disc; the driving disc is provided on the driving shaft in an axially sliding way, and abuts against the spool to make the spool move along the axes of the driving disc.

4. The rotation-type flow path switching valve according to claim 3, further comprising: a limiting plate which is fixed on the valve body; the first limiting mechanism comprises a second mating hole which is provided on the limiting plate and a second mating shaft which is provided on the driven disc; the second mating hole is provided with a second circumferential limiting portion.

5. The rotation-type flow path switching valve according to claim 4, wherein the second limiting mechanism comprises a first limiting end which is provided on the limiting plate and a second limiting end which is provided on the driven disc.

6. The rotation-type flow path switching valve according to claim 2, wherein the driving disc is connected with the driving shaft fixedly, and the driven disc abuts against the spool to make the spool move along the axes of the driven disc.

7. The rotation-type flow path switching valve according to claim 2, wherein,
the first convex-concave portion comprises two first convex portions which are provided oppositely and two first concave portions which are provided between the two first convex portions; the adjacent first convex portion and first concave portion are jointed by means of a first bevel portion;

the second convex-concave portion comprises two second convex portions which are provided oppositely and two second concave portions which are provided between the two second convex portions; the adjacent second convex portion and second concave portion are jointed by means of a second bevel portion;

wherein, a shape of the second convex portion adapts with a shape of the first concave portion, a shape of the second concave portion adapts with a shape of the first convex portion, and a shape of the second bevel portion adapts with a shape of the first bevel portion.

8. The rotation-type flow path switching valve according to claim 2, wherein when moving axially, the spool does not rotate; when rotating, the spool does not move axially.

9. The rotation-type flow path switching valve according to claim 2, wherein the flow path switching process of the rotation-type flow path switching valve comprises three stages: in a first stage, the driving shaft drives the driving disc to rotate, the spool axially moves in an opposite direction of abutting against the valve body, and the spool does not rotate; in a second stage, the driving shaft drives the driving disc to rotate, the spool synchronously rotates with the driving shaft, and the spool does not move axially; and in a third stage, the driving shaft and the driving disc do not rotate, the spool axially moves in a direction of abutting against the valve body, and the spool does not rotate.

10. The rotation-type flow path switching valve according to claim 1, wherein the second gap linkage mechanism comprises a first mating hole which is provided on the spool and a first mating shaft which is provided on the driving shaft; the first mating hole is provided with a first circumferential limiting portion; the match of the first mating shaft and the first mating hole makes the driving shaft drive the spool to rotate in its preset swivel stroke.

11. The rotation-type flow path switching valve according to claim 10, wherein the first mating shaft provided on the driving shaft is specifically a rectangular key shaft.

12. The rotation-type flow path switching valve according to claim 10, wherein the spool is a frustum structure of approximately small top and big bottom which is provided with at least two switching passages; ports of the two switching passages are provided on conical surfaces, the spring is provided at a bottom of the spool, and the first mating hole is provided at an upper part of the spool.

13. The rotation-type flow path switching valve according to claim 12, wherein the valve body is provided with a valve chamber of approximately small top and big bottom which matches with the spool; a valve port is provided on the conical surface of the valve body.

14. The rotation-type flow path switching valve according to claim 10, wherein when moving axially, the spool does not rotate; when rotating, the spool does not move axially.

15. The rotation-type flow path switching valve according to claim 1, wherein there is also a stopper which stops the spool from rotating provided on the valve body component.

16. The rotation-type flow path switching valve according to claim 15, wherein when moving axially, the spool does not rotate; when rotating, the spool does not move axially.

17. The rotation-type flow path switching valve according to claim 1, wherein when moving axially, the spool does not rotate; when rotating, the spool does not move axially.

18. The rotation-type flow path switching valve according to claim 17, wherein when the spool axially moves, under a pressure of the spring, to abut against the valve body, the driving shaft does not rotate.

19. The rotation-type flow path switching valve according to claim 1, wherein the flow path switching process of the rotation-type flow path switching valve comprises three stages: in a first stage, the driving shaft drives the driving disc to rotate, the spool axially moves in an opposite direction of abutting against the valve body, and the spool does not rotate; in a second stage, the driving shaft drives the driving disc to rotate, the spool synchronously rotates with the driving shaft, and the spool does not move axially; and in a third stage, the driving shaft and the driving disc do not rotate, the spool axially moves in a direction of abutting against the valve body, and the spool does not rotate.

20. The rotation-type flow path switching valve according to claim 19, wherein in the first stage and the second stage, the driven disc does not rotate;

in the third stage, the driven disc rotates, and a rotating direction of the driven disc is opposite to a rotating direction of the driving disc in the first stage.

* * * * *